United States Patent
Wang et al.

(10) Patent No.: US 9,875,769 B1
(45) Date of Patent: **\*Jan. 23, 2018**

(54) OPTICAL STORAGE SYSTEM DIVIDER BASED DRAW VERIFICATION WITH DIGITALLY SYNTHESIZED WRITING LASER PULSE SIGNAL

(71) Applicant: Oracle International Corporation, Redwood City, CA (US)

(72) Inventors: Lingtao Wang, Broomfield, CO (US); Matthew C. Fienberg, Northborough, MA (US); Forrest Lundstrom, Westminster, CO (US); Scott D. Wilson, Thornton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,484

(22) Filed: Aug. 22, 2016

(51) Int. Cl.
*G11B 7/00* (2006.01)
*G11B 20/10* (2006.01)
*G11B 7/1395* (2012.01)

(52) U.S. Cl.
CPC ...... *G11B 20/10046* (2013.01); *G11B 7/1395* (2013.01)

(58) Field of Classification Search
None
See application file for complete search history.

(56) References Cited

U.S. PATENT DOCUMENTS

| | | |
|---|---|---|
| 4,415,938 A | 11/1983 | Heitmann |
| 4,488,277 A | 12/1984 | McFarlane et al. |
| 4,980,878 A | 12/1990 | Szerlip |
| 5,105,413 A | 4/1992 | Bakx |
| 5,130,965 A | 7/1992 | Karaki et al. |
| 5,267,226 A | 11/1993 | Matsuoka et al. |
| 5,673,245 A * | 9/1997 | Yanagawa ............ G11B 7/0031 369/112.29 |

(Continued)

FOREIGN PATENT DOCUMENTS

| | | |
|---|---|---|
| EP | 0731455 | 9/1996 |
| EP | 0860827 | 8/1998 |

(Continued)

OTHER PUBLICATIONS

Optical head Design for 1TB Optical Tape Drive, Mandad Manavi et al., LOTS Technology, Inc., May 2000.

(Continued)

*Primary Examiner* — Peter Vincent Agustin
(74) *Attorney, Agent, or Firm* — Invoke (57) ABSTRACT

An optical storage system includes an optical head configured to split a light beam into a higher power main beam and a lower power side beam. The system also includes a controller. The controller is configured to modulate the higher power main beam according to writing commands to write to an optical medium while processing first data resulting from the lower power side beam being reflected from the medium and second data obtained from a look-up table that maps the writing commands to digital representations of filtered writing strategy waveforms to remove noise from the first data caused by the higher power main beam and generate output indicative of written data directly after writing.

20 Claims, 6 Drawing Sheets

(56) References Cited

U.S. PATENT DOCUMENTS

| | | | |
|---|---|---|---|
| 5,708,639 A | 1/1998 | Iwanaga | |
| 5,808,991 A | 9/1998 | Inoue | |
| 5,909,418 A | 6/1999 | Noda et al. | |
| 6,141,312 A | 10/2000 | Masters et al. | |
| 8,451,702 B2 | 5/2013 | Mahnad | |
| 2002/0003758 A1* | 1/2002 | Kubo | G11B 7/0901 |
| | | | 369/44.37 |
| 2003/0016598 A1* | 1/2003 | Tsuda | G11B 7/1381 |
| | | | 369/44.23 |
| 2003/0210632 A1* | 11/2003 | Shimozawa | G11B 7/1263 |
| | | | 369/53.26 |
| 2007/0041300 A1* | 2/2007 | Minemura | G11B 20/10009 |
| | | | 369/59.22 |
| 2008/0225656 A1 | 9/2008 | Stallinga et al. | |
| 2009/0022024 A1 | 1/2009 | Hayashi | |
| 2011/0103202 A1 | 5/2011 | Ichikawa | |
| 2011/0141863 A1 | 6/2011 | Mahnad | |
| 2013/0051203 A1* | 2/2013 | Mahnad | G11B 7/1395 |
| | | | 369/44.38 |
| 2013/0077456 A1* | 3/2013 | Takahashi | G11B 7/133 |
| | | | 369/53.23 |

FOREIGN PATENT DOCUMENTS

| | | |
|---|---|---|
| EP | 1610304 | 12/2005 |
| JP | H05073913 | 3/1993 |
| JP | S63166025 | 7/1998 |

OTHER PUBLICATIONS

MicroContinuum: Technology: Data Storage, "Optical Tape—A new Way to Archive Data", Copyright 2008.

\* cited by examiner

OPTICAL STORAGE SYSTEM DIVIDER BASED DRAW VERIFICATION WITH DIGITALLY SYNTHESIZED WRITING LASER PULSE SIGNAL

TECHNICAL FIELD

This disclosure relates to techniques for verifying data in an optical storage system.

BACKGROUND

Optical recording devices such as optical disk and optical tape drives commonly use an Optical Pickup Unit (OPU) or read/write head to write and retrieve data from associated optical media. Conventional OPUs may utilize different wavelength semiconductor laser diodes with complex beam path optics and electromechanical elements to focus and track the optical beam within one or more preformatted tracks on the medium to write or store the data and subsequently read the data. Data written to the medium with a laser at higher power may be verified in a separate operation or process after writing using a lower laser power, or may be verified during the write operation by another laser or laser beam. The ability to read and verify the data during the write operation may be referred to as Direct Read After Write (DRAW).

Current OPUs may use a diffraction grating or similar optics in the laser path to generate three beams from a single laser element including a higher power beam used for reading/writing data and for focusing, and two lower power satellite beams used for tracking. The three beams are focused to three corresponding spots on the surface of the optical storage medium used by the various optical and electromechanical elements of the OPU. In general, the higher power spot is positioned in the center or middle between the two satellite spots. In addition to reading/writing data and focusing, the center spot may also be used for one particular type of tracking operation in some applications. The lower power satellite spots generated from the lower power side beams are typically used for another type of tracking operation for specific types of media.

SUMMARY

Optical storage systems and methods of performing direct read after write for the same utilize circuitry and/or controllers configured to process signals read directly after writing to remove noise introduced by the writing. Because the writing process involves high-frequency writing strategy pulses in the laser's optical power for creating the crystal phase change on the optical recording layer of the media, the direct read laser power signal from the laser light sensor during the write contains modulation of the written data and the high-frequency writing pulses. Digital representations of writing strategy waveforms that are based on writing commands and obtained via computation or a look-up table, for example, may be divided into the signals to cancel out the noise and recover the written data. The delay or bias associated with the signals and waveforms may be tuned to improve the signal quality associated with the recovered data.

In one embodiment, an optical storage system includes an optical head that splits a light beam into a higher power main beam and a lower power side beam. The system also includes a controller that modulates the higher power main beam according to writing commands to write to an optical medium while processing first data resulting from the lower power side beam being reflected from the medium and second data obtained from a look-up table that maps the writing commands to digital representations of filtered writing strategy waveforms to remove noise from the first data caused by the higher power main beam and generate output indicative of written data directly after writing.

In another embodiment, an optical storage system includes an optical head and controller arrangement that writes data to an optical medium via a higher power main beam, and detects, directly after writing, feedback generated via a lower power side beam being reflected from the medium. The feedback contains the written data and noise caused by the higher power main beam. The arrangement also divides the feedback by digital data representing the higher power main beam to remove the noise and recover the written data, and generates output indicative of the written data.

In yet another embodiment, a method for performing direct read after write on an optical medium includes splitting a light beam into a higher power main beam and a lower power side beam, modulating the higher power main beam according to writing commands to write to the medium, and detecting feedback generated via the lower power side beam being reflected from the medium. The method also includes generating data representing filtered writing strategy waveforms from the writing commands via a look-up table, processing the feedback and the data representing filtered writing strategy waveforms to remove noise from the feedback caused by the higher power main beam, and generating output resulting from the processing indicative of data written to the medium.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1A:
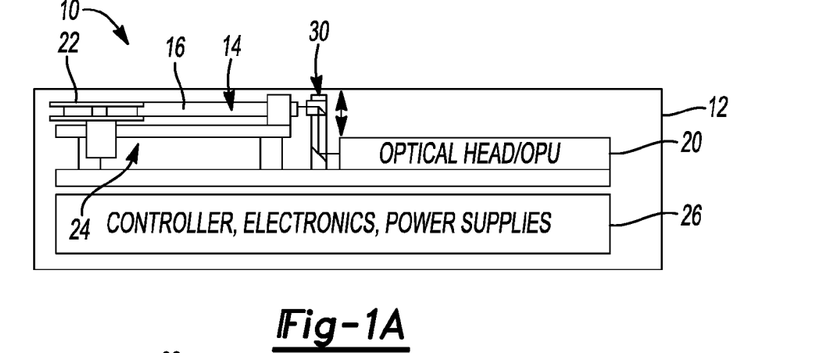
FIGS. 1A and 1B are block diagrams illustrating operation of an example optical data storage system or method with direct read after write (DRAW) capability.
Figure 1B:
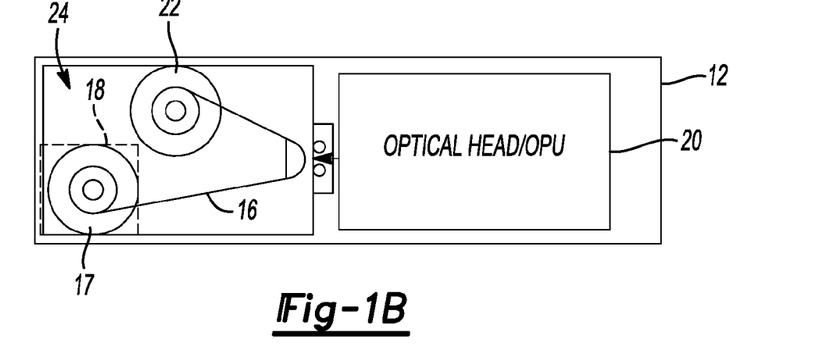

Referring now to FIGS. 1A and 1B, block diagrams illustrating operation of an example optical data storage system or method with direct read after write (DRAW) capability are shown. FIG. 1A is a side view diagram and FIG. 1B is a top or plan view diagram. In this embodiment, optical data storage system 10 is an optical tape drive 12 that receives an optical data storage medium 14, which is an optical tape 16. While illustrated and described with reference to an optical tape drive, those of ordinary skill in the art will recognize that the teachings of the present disclosure may also be applied to various other types of optical data storage devices that may use various types of write-once or re-writable optical media, such as optical discs. The optical tape 16 is a ½ inch (12.7 mm) wide tape having a plurality of tracks 36 generally extending across the width of the tape and may vary in length depending on the desired storage capacity and performance characteristics as illustrated and described in greater detail herein. Other tape configurations and dimensions, however, are also possible. The optical tape 16 may be wound on an associated spool 17 contained within a protective case or cartridge 18 that is manually or automatically loaded or mounted in the optical tape drive 12. Transport mechanism 24 moves the optical tape 16 through a carriage and past at least one optical pickup unit (OPU) or optical head 20 to a take-up spool 22 that typically remains within the tape drive 12. The OPU 20 writes data to, and reads data from, the optical tape 16 as the transport mechanism 24 moves the optical tape 16 between the cartridge 18 and take-up spool 22 in response to at least one controller and associated electronics 26. As explained in greater detail below, data may be read/written to the optical tape 16 in one or more of the tracks 36 in a serpentine fashion as the tape travels in either direction past the OPU 20, i.e., either from the cartridge 18 to the take-up spool 22, or from the take-up spool 22 to the cartridge 18.

The optical head 20 may include associated optics and related electromechanical servo controlled devices, represented generally by reference numeral 30, that split or divide a light beam, such as a laser beam, into two or more beams that are focused to corresponding spots on the storage medium 16 for reading/writing data as illustrated and described in greater detail with reference to FIG. 2. Various servo mechanisms (not specifically illustrated) may be used to position/align the beams with a selected one of the tracks 36 on the optical tape 16.

Figure 2:
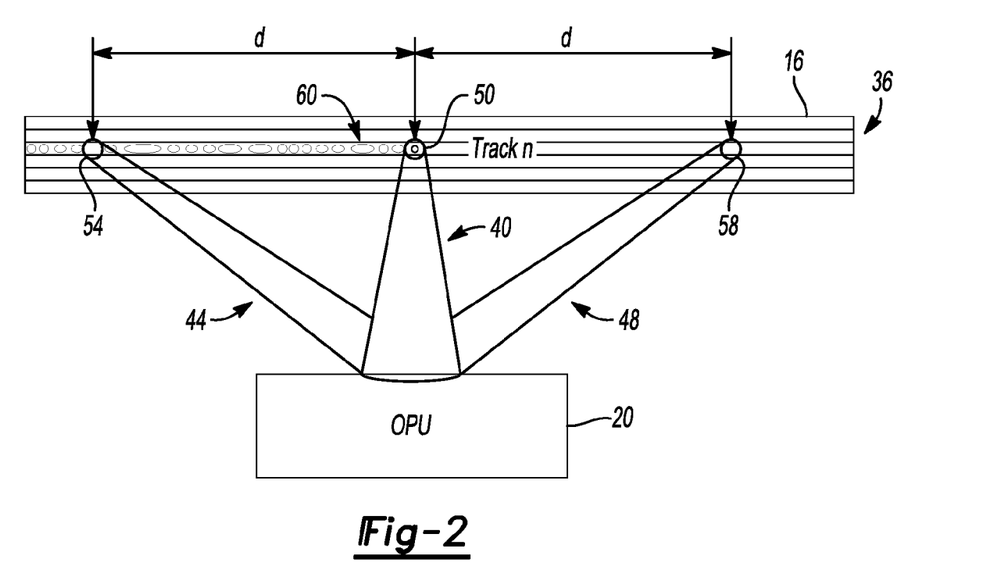
FIG. 2 is a block diagram illustrating operation of the optical pickup unit (OPU) of FIGS. 1A and 1B having a coherent light beam split or divided into a center beam and two satellite or side beams to provide DRAW capability.

FIG. 2 is a block diagram illustrating operation of the optical pickup unit (OPU) 20 having a coherent light beam split or divided into a center beam 40 and two satellite or side beams 44, 48 to provide DRAW capability. The beams 40, 44, 48 may be generated by a single or common coherent light source, such as a laser diode, for example. The source beam travels through associated optics, that may include a diffraction grating, for example, to divide or split the source beam into the center beam 40, first side beam 44, and second side beam 48 and to focus the beams to corresponding spots 50, 54, and 58, respectively, on the surface of the optical tape 16 within a selected one of the tracks 36. The three optical spots 50, 54, and 58 are manipulated by various optical and electrometrical elements of the OPU 20 to write and retrieve data from the optical tape 16.

The optical elements used to split the source beam and focus the resulting beams to the spots 50, 54, and 58 may be designed to provide higher power to the center beam 40 and center spot 50 with lower power to the side beams 44, 48 and associated spots 54, 58. For example, the center spot 40 may contain about 90% of the source beam power with the side beams 44, 48 dividing the remaining 10% of the source beam power. The center beam 40 is modulated by the OPU 20 to generate write marks 60 during writing of data to the optical tape 16, which may require about ten times more average power than to read previously stored data (such as about 7 mW to write data and about 0.3 mW to read data, for example). As such, if the source beam is modulated and produces sufficient power for writing data using the center beam/spot 40/50, the side beams 44, 48 will be modulated in a like manner but will contain insufficient power to alter the tape 16.

In this embodiment, the spots 50, 54, and 58 are mechanically aligned in the OPU manufacturing process to correspond to the axes of the data tracks 36. In addition, the satellite spots 54, 58 are generally symmetrically positioned relative to the center spot 50 so that transit distance (d) of the tape 16 between the center spot 50 and either of the satellite/side spots 54, 58 is substantially the same. Other embodiments may include a distance (d) of between about 10-20 μm—although other distances are also contemplated.

Certain conventional optical storage devices use the center spot 50 from the higher power emitting beam 40 for reading, writing, and focusing in addition to one type of tracking operation. The satellite spots 54, 58 formed by the lower power side beams 44, 48 are used for another type of tracking for specific types of media. In these applications, the side spots 54, 58 may not be aligned with one another, or with the center spot 50 along a single one of the tracks 36.

As previously described, the source laser beam is operated at a higher power (relative to operation during a data read/retrieval) and modulated to write the data marks 60 on a selected one of the tracks 36 on the optical tape medium 16. However, only the center beam 40 emits enough power to the optical tape 16 to actually alter the structure of the optically active layer. The satellite beams 44, 48, having much lower power as determined by the diffraction grating power distribution, do not alter the tape 16. They, however, have enough power after being reflected from the optical tape 16 to detect the data marks 60. Therefore depending on the direction of travel of the optical tape 16, the reflection from one or both of the associated satellite spots 54, 58 can be detected by the OPU 20 and used to verify the data marks 60 directly after being written by the main beam/spot 40/50 to provide DRAW operation. While the reflected beam associated with one of the satellite beams 44, 48 (depending on the direction of travel of the tape 16) contains information associated with the data marks 60 on the tape medium 16, the reflected beam is heavily contaminated by the modulation of the center beam 40 and other noise sources and generally exhibits a very low signal to noise ratio (SNR).

Here, some of the DRAW systems and algorithms contemplated use a demodulation/division method to verify written data during the write operation in real-time. For example during the write operation, the written data is decoded (read) from a reflected laser light signal by a high frequency demodulation circuit (divider circuit). Then, the signal quality of the decoded written data can be calculated by a Bit-Error-Rate (BER) detector in order to verify the written data. As a result, the time between data writing and data decoding in this example is less than 1 msec.

As mentioned above, data written by the main spot 50 could be read back by one of the satellite spots 54, 58 after a few micro seconds. The satellite spots 54, 58, however, only have a fraction of the light intensity of the main spot 50. Thus, the light intensity signal detected by either one of the satellite spots 54, 58 is modulated (distorted) with high-frequency laser pulses used for writing. In order to better decode the written data, the satellite spot reflected laser light intensity signal (RF signal) can be demodulated from the main spot writing laser pulse signal (FM signal) using, for example, a DRAW demodulation circuit in order to reverse the modulation caused by the writing pulsation of the laser diode. Also, frequency responses of the RF signal and FM signal can be matched by applying a matched filter before the demodulation. A filter and high-frequency demodulator, therefore, can be designed for decoding and verifying written data during the write operation. Thus, the demodulation and verification of written data can be in real-time.

Certain DRAW circuits contemplated herein require much less calculation cost by using a high frequency demodulator (e.g., analog high speed divider). This enables the operation of DRAW for multiple channels (e.g., 24 channels) simultaneously. Other advantages may include small size, low cost, and high speed for multi-channel designs.

Figure 3A:
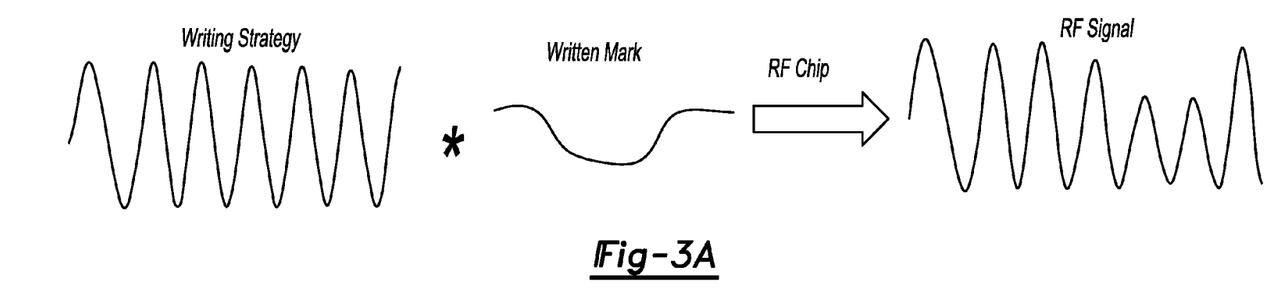
FIGS. 3A through 3C are diagrams illustrating components associated with RF and FM signal wave forms, and the result of their division.
Figure 3B:
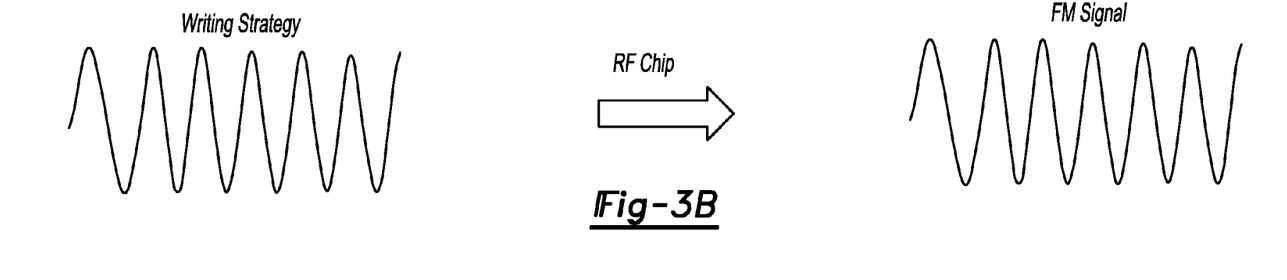
Figure 3C:
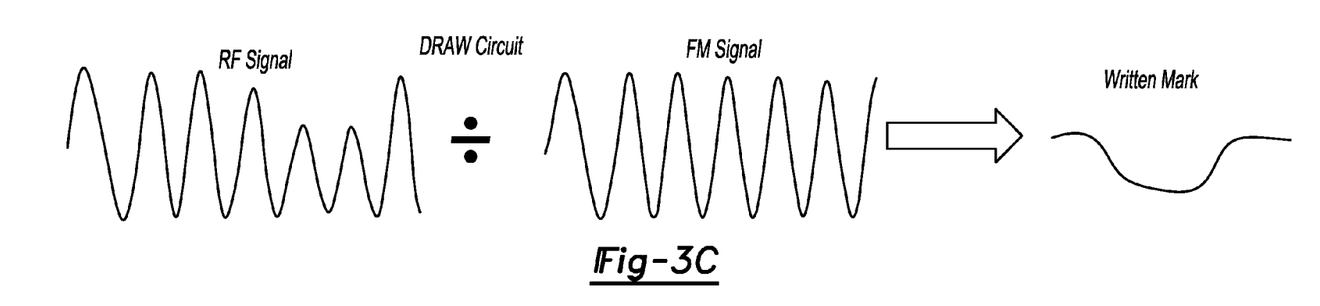

FIG. 3A shows that the RF signal detected by a corresponding RF chip (e.g., a photodetector chip, PDIC, placed at the end of the reflected optical light path of the OPU 20) not only contains data associated with the written mark being read but also the writing strategy waveform embodied by the main spot 50 at the time the written mark was being read. That is, the RF signal is subject to noise introduced by the writing strategy waveform. FIG. 3B shows that the FM signal detected by a corresponding FM chip (e.g., a front monitor chip, FMIC, placed at the laser light output path of the OPU 20) from the scatter associated with the center beam 40 is essentially the writing strategy waveform. FIG. 3C shows that the division of the RF signal by the FM signal via a DRAW circuit yields the written mark.

A voltage of the RF signal, $V_{RF}$, can be represented as $$V_{RF} = k_{RF} \times \varphi \times R \quad (1)$$

where $k_{RF}$ is a constant associated with the RF chip, $\varphi$ is the writing strategy modulated light intensity, and R is the changed reflectivity of the medium indicative of a written mark. And, a voltage of the FM signal, $V_{FM}$, can be represented as $$V_{FM} = k_{FM} \times \varphi \quad (2)$$

where $k_{FM}$ is a constant associated with the FM chip. Dividing (1) by (2) yields k×R, where k is $k_{RF}/k_{FM}$. Because $k_{RF}$ and $k_{FM}$ are known, R can be obtained free of influence from $V_{FM}$.

Figure 4:
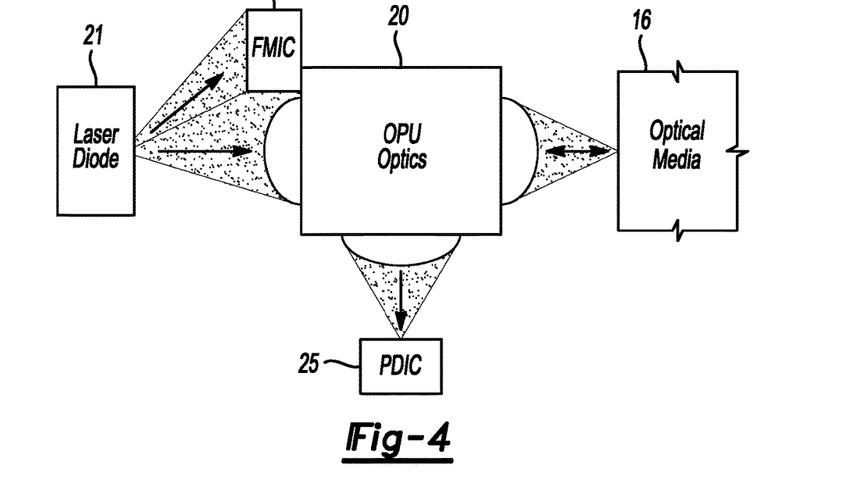
FIG. 4 is another block diagram illustrating operation of the example optical data storage system of FIGS. 1A and 1B.

FIG. 4 shows the OPU 20 and an FMIC chip 23 arranged to receive laser light from a laser diode 21. That is, the FM signal from the FMIC chip 23 represents the direct light output of the laser diode 21 without any modification by the OPU 20 or media 16. And, a PDIC chip 25 is arranged to receive light reflected from the media 16 and through the OPU 20.

Figure 5:
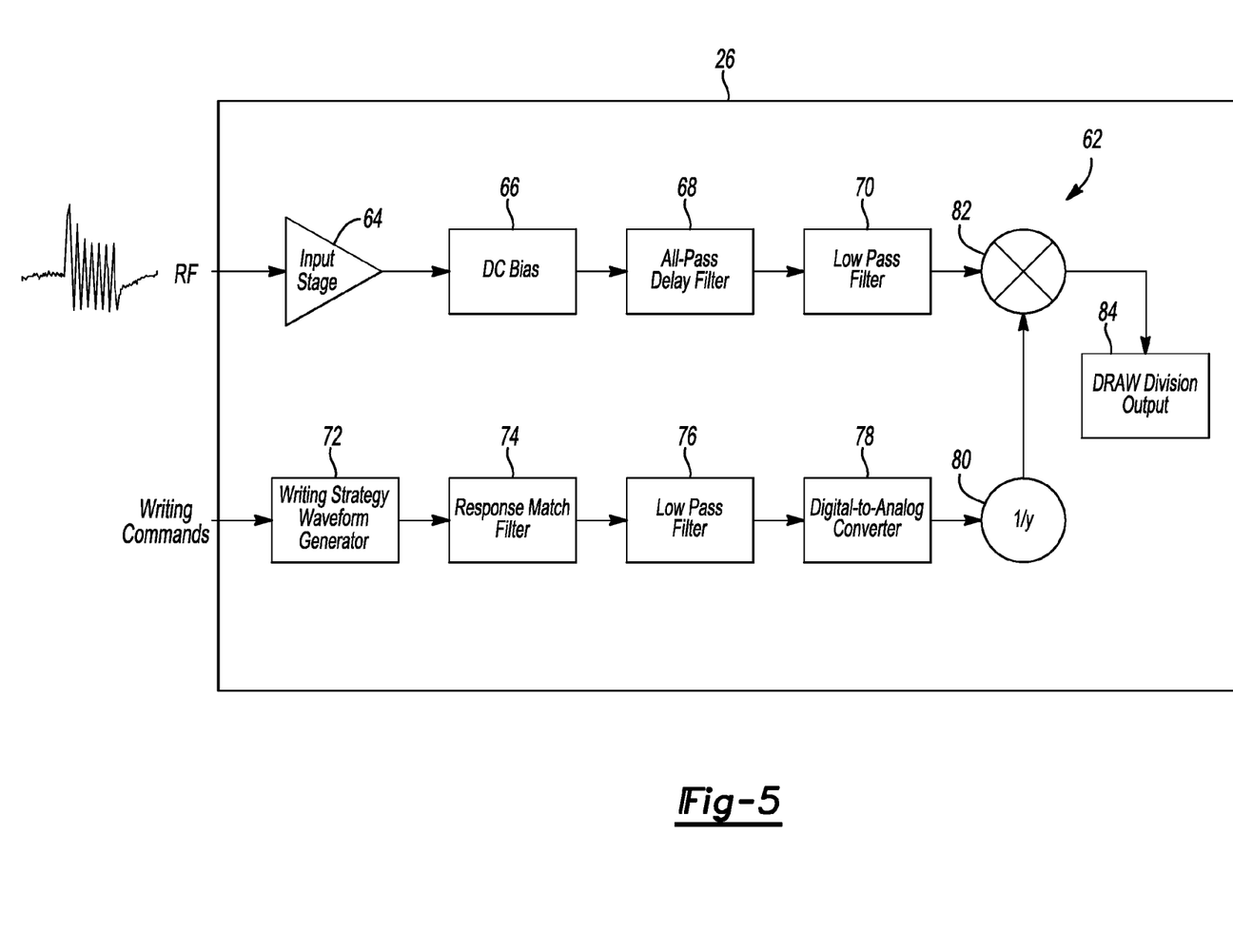
FIGS. 5 and 6 are block diagrams illustrating example DRAW demodulation circuits.

FIG. 5 shows the at least one controller and associated electronics 26 implementing a DRAW demodulation circuit 62 to perform the division described above. In this example, the circuit 62 includes an RF signal input stage 64, a direct current (DC) bias 66, an all-pass delay filter 68, and a low pass filter 70. The circuit 62 also includes a writing strategy waveform generator 72, a response match filter 74, a low pass filter 76, a digital-to-analog converter 78, an inverse 80, a multiplier 82, and a DRAW division output 84. That is, operations performed by elements 72 through 76 (or 80 and/or 82 in certain embodiments) are performed digitally. In embodiments in which operations performed by the inverse 80 and/or multiplier 82 are performed digitally, the digital-to-analog converter 78 would be implemented thereafter in the process flow.

The RF signal process flow is the input stage 64 to the DC bias 66, the DC bias 66 to the all-pass delay filter 68, the all-pass delay filter 68 to the low pass filter 70, and the low pass filter 70 to the multiplier 82. The sequence of these elements, however, may be rearranged as necessary. The low pass filter 70, for example, may come before the DC bias 66, etc. The FM process flow is the writing strategy waveform generator 72 to the response match filter 74, the response match filter 74 to the low pass filter 76, the low pass filter 76 to the digital-to-analog converter 78, the digital-to-analog converter 78 to the inverse 80, and the inverse 80 to the multiplier 82. The final leg of the process flow is the multiplier 82 to the DRAW division output 84.

To better align the data for division, the DC bias 66 applies a DC bias to the RF signal. In the example of FIG. 5, the bias is +1.3 volts. This value, however, may change depending on design considerations, medium configuration, etc. Also due to the differing delay associated with the RF and FM signal processing paths, the all-pass delay filter 68 applies a delay to the DC biased RF signal for synchronization purposes. In other embodiments, the all-pass delay filter 68 may be in the FM signal path. The frequency associated with the writing strategy can be on the order of 165 megahertz. This value, however, may change with tape speed, writing speed, etc. As such, the low pass filters 70, 76 filter out frequency content associated with the RF signal and synthesized FM signal respectively, in this example, greater than 50 megahertz for better performance in the demodulation stage. This value may also change with tape speed, writing speed, writing strategy pattern, etc. A calibration procedure may be performed to select the appropriate bias and delay values prior to operating at run time.

The writing strategy waveform generator 72 converts writing operation commands (coded in non-return-to-zero format in this example) to corresponding digital representations of writing strategy waveforms (writing strategy pulses) via computation. The response match filter 74 filters the output from the writing strategy waveform generator 72 to match the frequency response associated with the RF signal. The digital-to-analog converter 78 transforms the output from the low pass filter 76 to analog format before passing it to the inverse 80. The inverse 80 takes the inverse of the output from the digital-to-analog converter 78. The multiplier 82 multiplies the output from each of the low pass filter 70 and inverse 80 before passing it to the DRAW division output 84.

The high sampling rates (e.g., 2.65 Gsamples/s) associated with the above arrangement, however, may overly consume computational resources in multi-channel (e.g., 24 channel) configurations. As such, a lower sampling rate (e.g., 165 Msamples/s) and look-up table may be used to generate a synthesized FM signal with group delay and frequency response matched to that of the RF signal.

The coding strategy associated with the writing operation commands implements the run-length limited constraint such that the data cannot have more than a finite number of consecutive zeroes (e.g., 8) and a finite number of consecutive ones (e.g., 8). Therefore, the combination of consecutive zeros followed by consecutive ones has only 64 possibilities in this example. Also, the frequency responses of the response match filter 74 and low pass filter 76 are known. Hence by using a look-up table, each combination of NRZ zero and one pattern can be converted to a corresponding predefined filtered output. That is, NRZ patterns yield predictable filtered FM signals.

Figure 6:
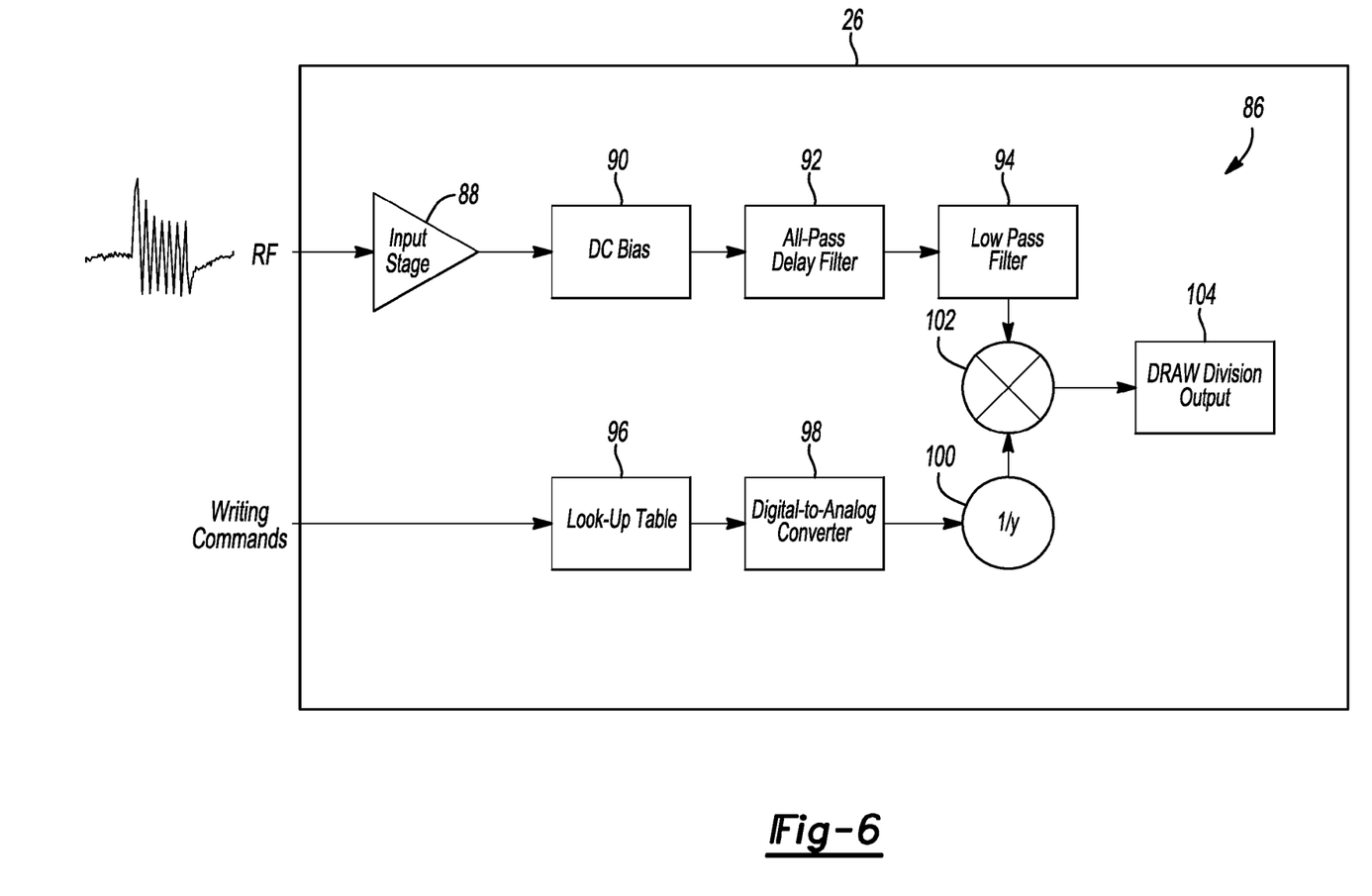

FIG. 6 shows the at least one controller and associated electronics 26 implementing another DRAW demodulation circuit 86 to perform the division described above. In this example, the circuit 86 includes an RF signal input stage 88, a DC bias 90, an all-pass delay filter 92, and a low pass filter 94 similar to that of FIG. 5. The circuit 86 also includes a look-up table 96, a digital-to-analog converter 98, an inverse 100, a multiplier 102, and a DRAW division output 104. In embodiments in which operations performed by the inverse 100 and/or multiplier 102 are performed digitally, the digital-to-analog converter 98 would be implemented thereafter in the process flow.

The look-up table 96 maps each of the possible NRZ patterns to a corresponding digital representation of a filtered FM waveform. The digital-to-analog converter 98 transforms the output from the look-up table 96 to analog format before passing it to the inverse 100. The inverse 100 takes the inverse of the output from the digital-to-analog converter 98. The multiplier 102 multiplies the output from each of the low pass filter 94 and inverse 100 before passing it to the DRAW division output 104.

Figure 7:
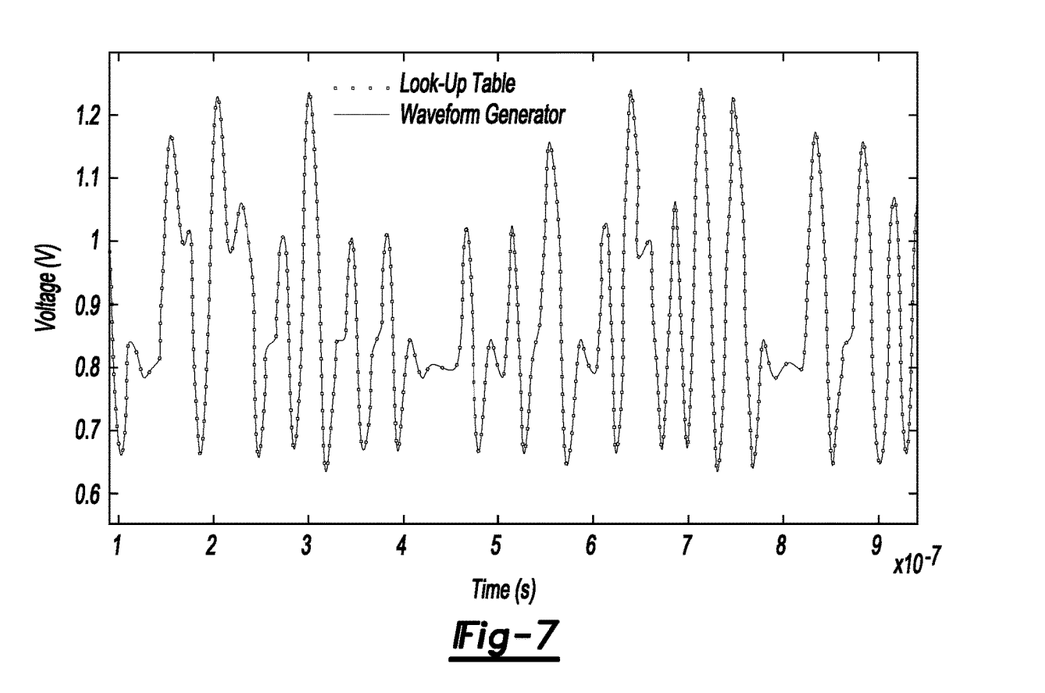
FIG. 7 is a plot comparing, for the same data, filtered FM output from the digital-to-analog converters of FIGS. 5 and 6.

FIG. 7 shows that filtered FM output, corresponding to the same writing commands, from the digital-to-analog converters 78, 98 of FIGS. 5 and 6 respectively is the same. That is whether the synthesized FM signal is obtained via computation (as in FIG. 5) or a look-up table (as in FIG. 6), the results are generally the same.

Figure 8:
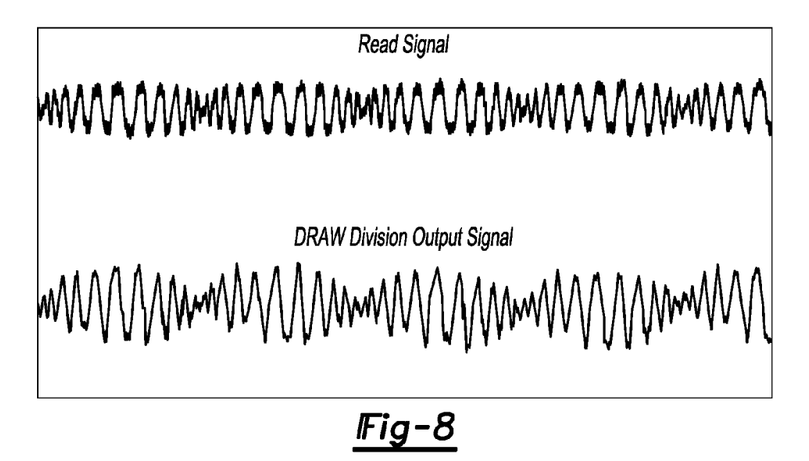
FIG. 8 is a plot comparing, for the same data, a read signal generated during a read operation (top waveform) and a DRAW division output signal generated by the DRAW demodulation circuit of FIG. 4 during a write operation (bottom waveform).

FIG. 8 shows the similarity between a read signal generated during a read operation (top wave form) and, for the same data, a DRAW division output signal generated by the DRAW division output 104 of FIG. 6 during a write operation (bottom wave form).

Figure 9:
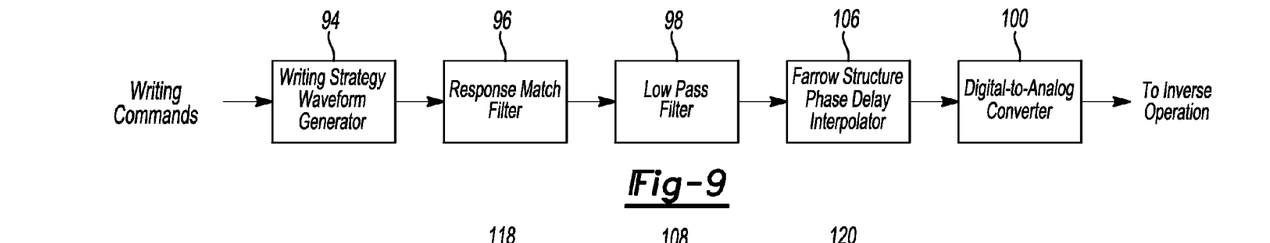
FIGS. 9 and 10 are block diagrams illustrating portions of the DRAW demodulation circuits of FIGS. 5 and 6 respectively with Farrow structure phase delay interpolators included therein.
Figure 10:
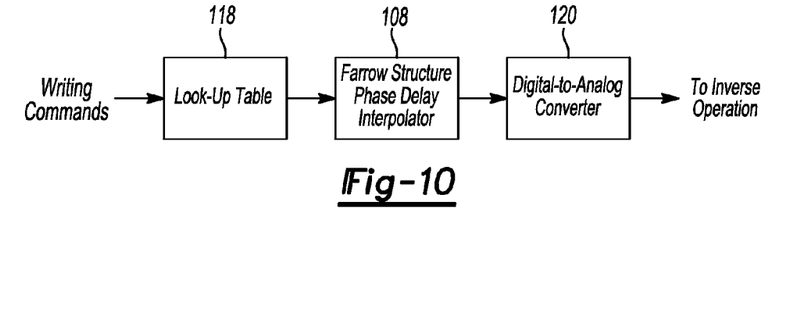

Finer adjustments to delay may be desired in certain applications. As such, a Farrow structure phase delay interpolator may be used in the synthesized FM signal path. FIG. 9 shows a portion of the synthesized FM signal path of FIG. 5 including a Farrow structure phase delay interpolator 106. The Farrow structure phase delay interpolator 106 operates in a known fashion to introduce delay into the output of the low pass filter 98 before transformation by the digital-to-analog converter 100. Likewise, FIG. 10 shows a portion of the synthesized FM signal path of FIG. 6 including a Farrow structure phase delay interpolator 108. The Farrow structure phase delay interpolator 108 operates in a known fashion to introduce delay into the output of the look-up table 118 before transformation by the digital-to-analog converter 120. A calibration procedure may be performed to select the appropriate coefficients for the Farrow structure phase delay interpolators 106, 108 prior to operating at run time.

Analog elements arranged to perform the above described processing may use PDIC and FMIC chips to detect the RF and FM signals respectively. To implement such an arrangement with high signal quality, the frequency responses and group delay of both the PDIC and FMIC chips should match within the frequency range from 1 MHz to 99 MHz. An off-the-shelf FMIC, however, may have different frequency response and group delay as compared with an off-the-shelf PDIC. Embodiments contemplated herein thus avoid this issue by digitally synthesizing the FM signal in order to replace the FM signal detected by the FMIC. In certain embodiments, field programmable gate arrays and high-speed digital-to-analog converters are used. As such, the synthesized FM signal frequency response and group delay can be made to match that of the RF signal for improved signal quality.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical storage system comprising:
   an optical head configured to split a light beam into a higher power main beam and a lower power side beam; and
   a controller configured to modulate the higher power main beam according to writing commands to write to an optical medium while processing first data resulting from the lower power side beam being reflected from the medium and second data obtained from a look-up table that maps the writing commands to digital representations of filtered writing strategy waveforms to remove noise from the first data caused by the higher power main beam and generate output indicative of written data directly after writing.

2. The system of claim 1, wherein the processing includes introducing delay into the digital representations of filtered writing strategy waveforms via a Farrow structure phase delay interpolator.

3. The system of claim 1, wherein the processing includes dividing the first data by the second data.

4. The system of claim 3, wherein the processing includes introducing delay into the first data via a filter prior to the dividing.

5. The system of claim 3, wherein the processing includes removing frequency content from the first data greater than a threshold via a filter prior to the dividing.

6. The system of claim 1, wherein the optical medium is an optical tape.

7. An optical storage system comprising:
an optical head and controller arrangement configured to write data to an optical medium via a higher power main beam,
detect, directly after writing, feedback generated via a lower power side beam being reflected from the medium, wherein the feedback contains the written data and noise caused by the higher power main beam,
divide the feedback by digital data representing the higher power main beam to remove the noise and recover the written data, and
generate output indicative of the written data.

8. The system of claim 7 further comprising computing the data representing the higher power main beam based on writing command input.

9. The system of claim 7 further comprising filtering the data representing the higher power main beam to match a frequency response of the feedback.

10. The system of claim 7 further comprising filtering the data representing the higher power main beam to remove frequency content therefrom exceeding a threshold.

11. The system of claim 7 further comprising introducing delay into the data representing the higher power main beam via a Farrow structure phase delay interpolator.

12. The system of claim 7, wherein the data representing the higher power main beam is digital representations of filtered writing strategy waveforms.

13. The system of claim 7 further comprising obtaining the data representing the higher power main beam via a look-up table that maps writing commands to digital representations of filtered writing strategy waveforms.

14. The system of claim 7, wherein the optical medium is optical tape.

15. A method for performing direct read after write on an optical medium, comprising:
splitting a light beam into a higher power main beam and a lower power side beam;
modulating the higher power main beam according to writing commands to write to the medium;
detecting feedback generated via the lower power side beam being reflected from the medium;
generating data representing filtered writing strategy waveforms from the writing commands via a look-up table;
processing the feedback and the data representing filtered writing strategy waveforms to remove noise from the feedback caused by the higher power main beam; and
generating output resulting from the processing indicative of data written to the medium.

16. The method of claim 15, wherein the processing includes introducing delay into the data representing filtered writing strategy waveforms via a Farrow structure phase delay interpolator.

17. The method of claim 15, wherein the processing includes dividing the feedback with the data representing filtered writing strategy waveforms.

18. The method of claim 17, wherein the processing includes introducing delay into the feedback via a filter prior to the dividing.

19. The method of claim 17, wherein the processing includes removing frequency content from the feedback greater than a threshold via a filter prior to the dividing.

20. The method of claim 15, wherein the optical medium is optical tape.

* * * * *